United States Patent [19]

Holy et al.

[11] 4,238,358

[45] Dec. 9, 1980

[54] HETEROGENEOUS CATALYTIC HYDROGENATION

[75] Inventors: Norman L. Holy, Bowling Green, Ky.; William A. Logan, Nashville, Tenn.; Karl D. Stein, Vincennes, Ind.

[73] Assignee: Western Kentucky University, Bowling Green, Ky.

[21] Appl. No.: 24,951

[22] Filed: Mar. 29, 1979

Related U.S. Application Data

[60] Division of Ser. No. 894,244, Apr. 7, 1978, which is a continuation-in-part of Ser. No. 787,584, Apr. 14, 1977, abandoned.

[51] Int. Cl.$^3$ .............................................. B01J 31/22
[52] U.S. Cl. .......................... 252/431 C; 252/429 R; 260/409; 562/496; 564/385; 564/423; 568/814; 568/876; 568/434; 585/269; 585/277
[58] Field of Search ....................... 260/667, 666 P; 252/431 C, 429 R

[56] References Cited

U.S. PATENT DOCUMENTS

| | | | |
|---|---|---|---|
| 3,755,194 | 8/1973 | Avilou et al. | 252/429 R |
| 4,098,727 | 7/1978 | Haag et al. | 252/431 R X |

FOREIGN PATENT DOCUMENTS 2326489 12/1974 Fed. Rep. of Germany ....... 252/431 C

OTHER PUBLICATIONS

Pittman et al., JACS, vol. 97, No. 7, 4/2/75, pp. 1749-1754.

*Primary Examiner*—Patrick Garvin
*Attorney, Agent, or Firm*—Birch, Stewart, Kolasch & Birch

[57] ABSTRACT

Anthranilic acid has been anchored to polystyrene, and rhodium, palladium, platinum and ruthenium complexes of this modified polystyrene have been prepared. These catalysts will reduce a variety of olefinic and aromatic hydrocarbons, and also nitrile, nitro and carbonyl functional groups, said carbonyl groups being present in either ketones or aldehydes.

9 Claims, No Drawings

HETEROGENEOUS CATALYTIC HYDROGENATION

This application is a divisional, of copending application Ser. No. 894,244, filed on Apr. 7, 1978 which is a continuation-in-part of Ser. No. 787,584, filed on Apr. 14, 1977, now abandoned.

This invention relates to a process for the heterogeneous catalytic hydrogenation of various organic compounds at relatively mild temperatures and pressures. More particularly, the invention relates to heterogeneous catalytic hydrogenation conducted at about room temperature and pressure of a few atmospheres, employing a complex of anthranilic acid and a rhodium, ruthenium, palladium or platinum compound anchored on a polymeric support, and to the catalyst itself.

THE PRIOR ART

The only patent known to the inventors which specifically discloses the use of a catalytic complex containing an anthranilic acid ligand for a catalytic hydrogenation is U.S. Pat. No. 3,755,194 to Avilov et al, issued on Aug. 28, 1973.

This patent relates to a homogeneous catalytic system for the hydrogenation of unsaturated compounds at room temperature and one atmosphere of hydrogen pressure. In this procedure, a rhelium (I) complex of N-phenylanthranilic acid is employed. However, this procedure, like other homogeneous catalytic systems, has the disadvantage that it is difficult to separate the hydrogenation product from the catalyst itself with the result that the catalyst is a contaminant or impurity in the final product.

No patent is known to the inventors which specifically discloses a catalytic composition in which anthranilic acid is employed to chemically link a catalyst metal to a polymer support. Typical prior art only discloses the use of a substituted phosphine for this purpose. Examples of this are to be found in Grubb set al, "Polymer Preprints", Amer. Chem. Soc., Div. Polym. Chem., 1972, Vol. 13, No. 2, pages 828-32 [Chem. Abstracts, Vol. 81, 6555d, (1974)], and also Grubbs et al, "J. Macromol. Sci. Chem.", 1973, Vol. 7, No. 5, pages 1047-1063 [Chem. Abstracts, Vol. 78, 164622r (1973)]. Another example of a disclosure of this kind is U.S. Patent No. 3,960,962 to Shubkin, issued June 1, 1976, which also contains an excellent summary of the relevant prior art in lines 1-27 of column 1.

OBJECTS OF THE INVENTION

One of the objects of the present invention is to provide a catalyst system which permits the hydrogenation of unsaturated organic compounds to be carried out under relatively mild conditions of temperature and pressure.

Another object of the present invention is to provide a process for the heterogeneous catalytic hydrogenation of organic compounds which will avoid the disadvantages of carrying out such a reaction with the prior art homogeneous catalysts, i.e., it is difficult to separate the hydrogenation product from the catalyst itself, with the result that the catalyst is a contaminant or impurity in the final product.

These and other objects and advantages of the invention will become apparent to those skilled in the art from a consideration of the following specification and claims.

DETAILED DESCRIPTION OF THE INVENTION

These objects are accomplished by the process of the present invention which in its broad aspects comprises carrying out the hydrogenation of organic compounds in the presence of a complex of anthranilic acid with a rhodium, ruthenium, palladium or platinum compound anchored on a polymeric carrier.

The Catalyst Employed

As noted above, a complex of anthranilic acid with a rhodium, ruthenium, palladium or platinum compound anchored on the polymeric carrier is employed as the catalyst of the present invention. This catalyst is prepared in the following manner.

In the first stage, a polystyrene polymer, cross linked to the desired extent with, for example, divinylbenzene, is chloromethylated. A typical polystyrene polymer is XAD-4, obtained from the Rohm and Haas Co. of Philadelphia, Pa. These spheres are chloromethylated by procedures well known to those skilled in the art.

Anthranilic acid is then anchored to the chloromethylated beads by stirring them with an excess of anthranilic acid in a reaction medium such as ethyl ether, acetone, or dimethylformamide. The chloromethylated beads are recovered, for example, by filtration, and then washed with absolute ethanol.

Next, the beads thus prepared are slurried in a reaction medium, and there is also added thereto a rhodium, ruthenium, palladium or platinum compound. After stirring of this slurry for a suitable length of time, the beads are recovered, e.g., by filtration, and washed. Finally, in the case of the rhodium or ruthenium compound containing beads, they can be subjected to a treatment with a reducing agent, e.g., sodium borohydride, while suspended in a reaction medium.

Various rhodium, ruthenium, palladium and platinum compounds can be employed in the preparation of the catalyst of the invention. Examples of such salts are $Rh(NO_3)_3$, $Rh_3O_3$, rhodium (III) pentanedionate, rhodium or ruthenium trihalides such as $RhCl_3$ and $RuCl_3$, $PdCl_2$, $K_2PdCl_4$, $K_2PtCl_4$ and the like. The rhodium or ruthenium compound is treated with a reducing agent to selectively reduce the higher valence state of the Rh or Ru to the lower catalytic state without affecting or reducing the anthranilic acid present in the catalytic complex. Such reducing agents include, for example, sodium borohydride, metallic sodium (in ethanol), sodium hydride, Zn dust and hydrochloric acid, vanadium chloride, chromium chloride, lithium aluminum hydride, etc.

Various polymeric supports in the form of, for example, beads, blocks, fibers, spheres, filaments, etc., may be used in the catalyst of the present invention. The use of polymers in the form of beads has been found to be advantageous since the anthranilic acid can be incorporated into such beads quite easily merely by stirring a mixture thereof in a suitable organic solvent or, if desired, with heating to a temperature as high as the reflux temperature of the system. The latter expedient may be employed for a better and faster incorporation of the anthranilic acid into the beads. Polymeric beads having a size of about 1 to 10 mm. can be suitably employed, although beads having a size as large as 2-5 cm. can also be used with advantage. Generally, however, the smaller beads are preferred since they provide a greater surface area for catalytic action.

Particularly suitable polymeric supports for use in the invention are polystyrene polymers because of the ease of introducing different chemical groups into the backbone thereof, i.e., pendant groups. The amino group of the anthranilic acid can then be condensed with any of said groups whereby said anthranilic acid is anchored to said polymer. As stated above, chloromethylated polystyrene beads (for example, Rohm and Haas XAD-4 Amberlite, chloromethylated with chloromethyl methyl ether (finally containing 10.02% chlorine), are advantageously used as the polymeric support for the catalyst of the invention. Although not completely understood at the present time, the exact nature of the support is apparently important in providing the desired result of a smooth and high yield hydrogenation at low temperature and pressure. Thus, the use of anthranilic acid on polyvinyl chloride beads resulted in a catalyst system having negligible activity (1% hydrogenation of benzene after 48 hrs. at 60 psig.)

On the other hand, other polymers having a reactive nature which can be provided with pendant groups whereby the anthranilic acid can be anchored to the polymer support by condensation of said groups with the amino groups of said acid can be readily used. Examples of such polymers include chlorinated polystyrene in which chlorine atoms can serve as pendant groups, and copolymers of styrene with other copolymerizable monomers. Other polymers such as polyacrylates, which inherently have carboxylic acid functions, can be employed advantageously as the polymer substrate in forming the catalyst of this invention. In addition, they may be prepared as described in U.S. Pat. No. 2,597,437 to Bodamer, issued May 20, 1952.

Further, in functional terms, the polymer support must additionally contain pendant groups such as sulfonate, methanesulfonate, tosylate, carboxylate, cyanomethyl and the like groups, which can be readily reacted so as to effect a condensation between the amino group of the anthranilic acid and the pendant groups of the polymeric chain. Thus, within this context, it is apparent that a wide variety of polymer supports can be used successfully in connection with the preparation of the heterogeneous catalytic system of the invention.

While the exact nature of the bonding in the catalyst is not known with certainty, it is believed that said bonding is of the following nature. In the case of chloromethylated polystyrene beads the following reaction with the anthranilic acid is believed to occur:

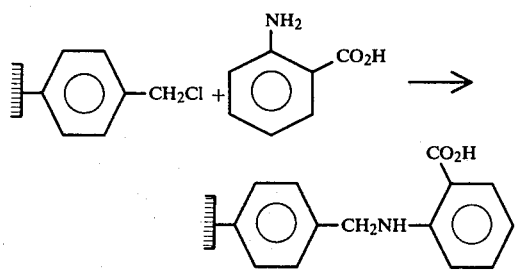

In the above reaction scheme the symbol:

≡ equals the polymer backbone.

When the product of the above-described reaction is then treated with, e.g., palladium dichloride, then it is believed that the following product is obtained:

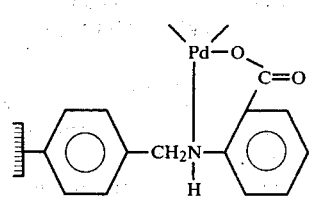

The Starting Feedstock Or Starting Unsaturated Organic Compounds

The feedstock or starting organic compounds advantageously hydrogenated using the catalyst of this invention include organic compounds containing sterically unhindered carbon-to-carbon double bonds, triple bonds or aromatic bonds, for example, unsubstituted aromatics such as benzene, naphthalene or anthracene, alicyclic compounds such as cycloolefins, e.g., cyclopentadiene and cyclohexene, alkenes and alkynes such as ethylene, propene, butene, acetylene, etc. and dienes such as butadiene. Unsaturated compounds containing inter alia, such functional groups as nitro, carbonyl or nitrile can be successfully hydrogenated with the catalyst of this invention to effect reduction of said functional groups.

Operating Parameters

The catalysts can be utilized as slurries or as fixed beds, movable beds and fluidized beds, in liquid phase or vapor phase, in batch, continuous or staged operations. Hydrogenation reactions can be carried out at remarkably low temperatures and pressures as contrasted with the more conventional catalysts, whether the reaction is conducted in the liquid phase or the vapor phase. Hydrogenation reactions are generally conducted at temperatures ranging from about 20° C. to about 180° C. However, room temperature is preferred because of the simple apparatus that can be employed and a lowered energy requirement. The reactions can be conducted at lower than atmospheric pressures or greater than atmospheric pressure, but generally pressures ranging from about as low as one atmosphere to about 1000 psig can be employed. Preferably, however, pressures ranging from about one atmosphere to about three atmospheres are employed in conducting the reactions, again because of simpler apparatus that can be employed and a lowered energy requirement.

When it is desired to carry out the hydrogenation reactions essentially to completion, an excess of hydrogen over the stoichiometric requirement is used. This excess may vary from about a few percent to several hundred or even several thousand percent. In the latter cases, the excess hydrogen is separated and recycled to the system. When it is desired to carry out partial hydrogenations, the reaction can be controlled on the basis of hydrogen concentrations, e.g., mol ratio of $H_2$ to feed, or reaction kinetics, e.g., using an excess of hydrogen and controlling the reaction by time, temperature, $H_2$ partial pressure and the like.

The hydrogenation reaction may be conducted in an inert organic solvent in a conventional manner. The relative rate of hydrogenation does vary to some extent, depending upon the particular solvent employed. However, this variation does not affect the basic principles of this invention. For example, a 20% solution of cyclohexene was hydrogenated at 50 psig in the following solvents, the resulting rate of hydrogenation being as shown in Table 1.

TABLE 1

| Solvent | Relative Rate Of Hydrogenation |
|---|---|
| Acetonitrile | 1.8 |
| Dimethylformamide | 1.5 |
| Ethyl Ether | 1.0 |
| Cyclohexane | 1.0 |

Another operating parameter is the storage stability of the catalyst system. Most advantageously, the impregnated beads should be used in the catalytic hydrogenation system as soon as possible after their preparation. However, it is possible to use the beads after storage, although the activity thereof for the hydrogenation reaction does decrease with time, particularly when stored in air. In any event, the catalytic beads of the invention are relatively stable, even to $O_2$, and, for example, demonstrate 50% activity even after storage for 6 days in air.

EXAMPLES OF THE INVENTION

The following examples are given as merely illustrative of the present invention, and are not to be considered as limiting. Unless otherwise indicated, the percentages therein and throughout the specification are by weight.

TABLE 2

| | Hydrogenation with Rh(I) - Polymer[a] | | | | | | | |
|---|---|---|---|---|---|---|---|---|
| Entry | Substance | mmol | mmol cat. | Time hr. | Pressure psig | Temp. °C. | Products yields (%) | Cycles/ Atom-h |
| 1 | Cyclohexane | 200 | .075 | 8.00 | 30 | rm | Cyclohexane (40) | 130 |
| 2 | 1-Hexene | 16 | .007 | .50 | 30 | rm | Hexane (47) | 2100 |
| 3 | Trans-3-hexene | 16 | .007 | .66 | 30 | rm | Hexane (69) | 2400 |
| 4 | 2,3-Dimethyl-2-butene | 16 | .007 | 3.40 | 30 | rm | N.R | — |
| 5 | 1,3-Cyclootadiene | 80 | .030 | 3.00 | 50 | rm | Cyclooctane (1) Cyclooctene (15) | 150 |
| 6 | 1,5-Cyclooctadiene | 80 | .030 | 3.00 | 50 | rm | Cyclooctane (1) Cyclooctene (6) 1,3-Cyclooctadiene (6) | 70 |
| 7 | 4-Octyne | 30 | .20 | .33 | 50 | rm | Octane (4) Cis-4-octene (40) | 220 |
| 8 | Cinnamyl alcohol | 30 | .015 | 18.00 | 50 | rm | 3-Phenyl-1-propanol (20) | 20 |
| 9 | Trans Cinnamic Acid | 90 | .015 | 24.00 | 50 | rm | 3-Phenylpropanoic Acid (10) | 8 |
| 10 | 2-Cyclohexen-1-one | 90 | 1.000 | 18.00 | 60 | rm | Cyclohexanone (100) | 5 |
| 11 | Corn Oil (9.2 g) | | .20 | 20.00 | 50 | rm | No detectable hydrogenation | — |
| 12 | Corn Oil (9.2 g) | | .030 | 1.00 | 500 | 70 | 60% hydrogenated | — |
| 13 | Benzene | 230 | 3.000 | 18.00 | 50 | rm | Cyclohexane (99) | 4.2 |
| 14 | Benzene | 230 | .35 | 18.00 | 1000 | rm | Cyclohexane (12) | 4 |
| 15 | Benzene | 230 | .35 | 5.00 | 1000 | 100 | Cyclohexane (25) | 30 |
| 16 | Benzene | 230 | .35 | 3.00 | 1000 | 180 | Cyclohexane (10) | 20 |
| 17 | Benzene | 115 | .044[b] | 6 | 600 | 70 | Cyclohexane (9) | 40 |
| 18 | Toluene | 90 | .20 | 18 | 50 | rm | Methylcyclohexane (15) | 3 |
| 19 | p-Xylene | 160 | .20 | 14 | 1000 | 100 | 10% Hydrogenation | 5 |
| 20 | Ethyl Benzoate | 90 | .20 | 20 | 1000 | 100 | Trace Hydrogenation | — |
| 21 | Napthalene Benzene | 70 110 | .20 | 3 | 1000 | 70 | 1, 2, 3, 4-Tetrahydronaphthalene (100) cyclohexane (80) | 120 150 |
| 22 | Nitrobenzene | 100 | .20 | 2 | 800 | 70 | Aniline (100) | 250 |
| 23 | Nitrobenzene | 100 | .20 | 4 | 60 | rm | No Detectable Hydrogenation | — |
| 24 | Benzonitrile | 100 | .20 | 17 | 1000 | 100 | PhCH$_2$NHCH$_2$Ph (20) | — |
| 25 | Heptanal | 75 | .20 | 17 | 1000 | 100 | Heptanol (25) | — |
| 26 | Acetone (dry) | 130 | .025 | 4 | 800 | 100 | Isopropyl Alcohol (1) | 13 |
| 27 | Acetone (1% H$_2$O) | 130 | .025 | 4 | 800 | 100 | Isopropyl Alcohol (2) | 26 |

[a]All runs were 2% divinylbenzene cross-linked beads except for Entries 10, 13, and 17, which involved 80% divinylbenzene; 20% styrene beads.
[b]Beads stored for 1.5 years under air.

TABLE 3

| | Hydrogenation with Pd(II)-polymer[a] | | | | | | |
|---|---|---|---|---|---|---|---|
| Entry | Substance | mmol | mmol cat. | Time (h) | Pressure (psig) | Temp. °C. | Products | Cycles Atom-h |
| 28 | Cyclohexene | 200 | .026 | 16 | 400 | 80 | Cyclohexane (6) | 290 |
| 29 | 1,3-Cyclooctadiene | 40 | .0050 | .75 | 50 | rm | Cyclooctane (1) Cyclooctene (52) | 5800 |
| 30 | 1,3-Cyclooctadiene | 1200 | .125 | 10 | 50 | rm | Cyclooctane (1) Cyclooctene (36) | 360 |
| 31 | 1,5-Cyclooctadiene | 40 | .0050 | .75 | 50 | rm | Cyclooctane (trace) Cyclooctene (25) 1,3-Cyclooctadiene (6) | 2700 |
| 32 | 4-Octyne | 35 | .0064 | 4 | 50 | rm | Octane (7) Cis-4-Octene (90) | 1400 |
| 33 | Cinnamaldehyde | 160 | .064 | 1 | 400 | 85 | 3-Phenylpropanal (30) 3-Phenyl-1-propanol (30) | — |
| 34 | Cinnamyl alcohol | 160 | .025 | 16 | 400 | 100 | 3-Phenyl-1-propanol (100) | 400 |
| 35 | Corn Oil 81g | | .33 | 2 | 300 | 60 | 35% hydrogenation | — |
| 36 | Corn Oil 18g | | .33 | 3 | 500 | 100 | 90% hydrogenation | — |

TABLE 3-continued

Hydrogenation with Pd(II)-polymer[a]

| Entry | Substance | mmol | mmol cat. | Time (h) | Pressure (psig) | Temp. °C. | Products | Cycles Atom-h |
|---|---|---|---|---|---|---|---|---|
| 37 | Corn Oil 138g | | .125 | 14 | 500 | 80 | 48% hydrogenation | — |
| 38 | Soybean Oil Methyl Ester 8g | | .041 | 1 | 300 | 80 | 60% hydrogenation | — |
| 39 | Benzene | 200 | .125 | 16 | 600 | 100 | Cyclohexane (19) | 20 |
| 40 | p-Xylene | 160 | .050 | 30 | 800 | 100 | 1% hydrogenation | 1 |
| 41 | Nitrobenzene | 500 | .132 | 3.5 | 1000 | 80 | Aniline (97) | 1000 |
| 42 | Benzonitrile | 200 | .030 | 16 | 700 | 1000 | Dibenzylamine (20) | — |

[a]All entries are with 2% divinylbenzene: 98% styrene polymer.

TABLE 4

Hydrogenation with Platinum- and Ruthenium-Polymers[a]

| Entry | Substance | mmol. | Metal | mmol. cat. | Time (h) | Pressure (psig) | Temp. °C. | Products | Cycles Atom-h |
|---|---|---|---|---|---|---|---|---|---|
| 43 | 1,3-cyclooctadiene | 200 | Pt | .13 | 6.0 | 50 | rm | Cyclooctane (6) Cyclooctene (20) | 80 |
| 44 | Cyclohexene | 240 | Pt | .13 | 8.0 | 50 | rm | Cyclohexane (100) | 230 |
| 45 | Cyclohexene | 90 | Ru | .50 | 1.5 | 50 | rm | Cyclohexane (100) | 120 |
| 46 | Benzene | 30 | Ru | .083 | 24 | 50 | rm | Cyclohexane (5) | 0.8 |
| 47 | 2-Cyclohexen-1-one | 30 | Ru | .083 | 17 | 50 | rm | Cyclohexanone (100) | 20 |

[a]Entries 43 & 44 are with 2% divinylbenzene: 98% styrene polymer;
[b]Entries 45–47 are with 80% divinylbenzene: 20% styrene polymer.

PROCEDURE FOR CARRYING OUT EXAMPLES 1–47

Anchoring Of Anthranilic Acid On Polymer Support

Amberlite XAD-4 was supplied by the Rohm and Haas Company. It was obtained as hard, insoluble 20-50 mesh spheres. The polymer was received wet and was dried in a rotary evaporator at 50° for 12 hours before being used. Chloromethylation was performed according to the procedure of Pepper et al (J. Chem. Soc., p. 4087 (1953)). In one batch the chlorine content was 10.02%; in another it was 11.31%.

Anthranilic acid was anchored to the beads by stirring the beads with an excess of anthranilic acid in ethyl ether, acetone, or DMF. The following procedure was typical. To 1.00 g of the chloromethylated beads suspended in 50 ml of ethyl ether was added 0.5 g of anthranilic acid. This was stirred for 200 hours, filtered, and washed with 200 ml of absolute ethanol.

Reagent grade chemicals were generally used and were not purified further. Duplicate runs were made with bulk grade benzene and no noticeable initial rate differences were observed.

Soybean methyl ester was prepared as described by Hartman (J. Amer. Oil Chem. Soc., Vol. 34, page 165 (1957)). Corn oil was Matheson, Coleman and Bell, U.S.P. grade and was employed without purification.

Metal-Polymer Complexes

Rh(I)-Anthranilic Acid Polymer

A mixture of 1.00 g of the anthranilic acid anchored beads was stirred for 24 hours with 0.10 g of rhodium trichloride trihydrate in 5 ml of absolute ethanol. After filtration, the beads were washed with 200 ml of absolute ethanol, suspended in 5 ml of absolute ethanol and treated with 0.1 g of sodium borohydride. The color immediately changed to a dark brown. The beads were dried under vacuum for 1 hour. Analysis: Rh; 0.96%; N, 0.40%.

Pd(II)-Anthranilic Acid Polymer

The following procedure was typical for the incorporation of Pd(II). Under a nitrogen atmosphere, 1.00 g of the anthranilic acid-anchored beads was suspended in 500 ml of spectral grade acetone and 4 ml of distilled, dry acetonitrile, and 0.09 g of palladium chloride was added. After refluxing the suspension for 20 hours, it was cooled, filtered, and the light yellow product was washed with 500 ml of acetone, and then vacuum-dried for one hour. Analysis: Pd, 3.35; N,0.39%.

Platinum-Anthranilic Acid Polymer

The platinum catalyst was prepared very much like the Pd(II) polymer. Under a nitrogen atmosphere, 1.31 g of the anthranilic acid anchored beads and 0.27 g of $K_2PtCl_4$ were suspended in 500 ml of acetone and refluxed for 20 hours. The suspension was cooled, filtered and washed with 500 ml of acetone. The beads were vacuum dried for one hour. Analysis: Pt, 1.99; N,0.40.

Ruthenium-Anthranilic Acid Polymer

This catalyst was prepared in the manner of the Rh(I) catalyst. Under nitrogen, 0.30 g of the anthranilic acid-anchored beads was stirred for 24 hours with 0.10 g of $RuCl_3 \cdot 2H_2O$ in 5 ml of absolute ethanol. After filtering and washing with 200 ml of ethanol the beads were suspended in 5 ml of ethanol and treated with excess sodium borohydride. After stirring for 0.5 hour the beads were filtered, washed with 200 ml of ethanol and air-dried for one hour before use. Analysis: Ru, 1.68%; H,0.35%.

Instruments and Hydrogenation Procedure

Low pressure hydrogenations were carried out in a standard, catalytic apparatus (Parr Instrument Co., Model 3911). In a typical run a 500 ml reactor was charged with unsaturated compound and catalyst, the system was sealed, purged three times with hydrogen, then pressurized to 60 psig. For high-pressure hydrogenation, the reactants were added to the 300 ml reaction vessel of an Aminco Shaking Assembly (Cat. No.

44-13106). The reaction vessel was flushed three times with hydrogen. For room temperature reactions the pressure was then adjusted to the desired level. For higher temperature reactions, the reactor was partially pressurized and then heated, with shaking, to the desired temperature. The pressure was then adjusted to the desired level. The reactions were not considered to have begun until the system was at the desired temperature and pressure, and all reaction times were measured from this point. Since there was no method of collecting a sample at this point a few reactions were terminated immediately; a low percentage of hydrogenation was observed.

COMPARATIVE EXAMPLES

In order to demonstrate that the catalyst system of this invention is quite sensitive, and that the exact constitution thereof is critical in obtaining the desired hydrogenation results, the following comparative examples have been carried out.

EXAMPLE 48

The methyl ester of N-phenylanthranilic acid was prepared in refluxing methanol and sulfuric acid. An excess of the ester was then stirred with chloromethylated polystyrene beads (Rohm and Hass XAD-4 Amberlite, chloromethylated with chloromethyl methyl ether, 10.02% chlorine). A mildly exothermic reaction occurred immediately, but the mixture was stirred for three days to ensure complete incorporation. The protecting methyl group was removed by refluxing the beads for three hours in 10% aqueous sodium hydroxide. After washing thoroughly with water, the beads were stirred with an excess of $RhCl_3.3H_2O$ in absolute ethanol for two days. After rinsing the beads with ethanol, they were suspended in absolute ethanol and an excess of sodium borohydride was added. There was an immediate change of color of the beads to black; after washing the beads thoroughly with ethanol, they were air-dried for a few minutes. Adding 0.300 g of the beads prepared in this fashion to 20 ml of cyclohexene and hydrogenating at 30-50 psig resulted in no detectable cyclohexane formation after 8 hours.

This example shows that the N-phenylanthranilic acid complex on a chloromethylated polystyrene support is not effective in accordance with this invention.

EXAMPLE 49

In order to provide the closest model to the ligand of this invention as described by Avilov et al, a homolog of the N-phenylanthranilic acid catalyst (essentially an N-benzylanthranilic acid complex) was prepared and tested. This ligand was chosen as the model for comparison since it appears to provide the closest molecular structure when considering the styrene polymer support, i.e., a complex involving two parallel anthranilic acid derivative units between two strands of styrene polymer chains.

In the manner described in Example 1, an N-benzylanthranilic acid complex of rhodium (I) was prepared on a polystyrene bead support. The resulting black microcrystalline powder was insoluble in dimethyl formamide, quite unlike the catalyst prepared from N-phenylanthranilic acid. Furthermore, after hydrogenation of benzene had been conducted for 8 hours under 20-50 psig of hydrogen, there was no trace of hydrogenation. Under the sameconditions and with the same catalyst, only a trace of cyclohexane was produced from cyclohexene.

EXAMPLE 50

To a solution of 0.070 g. of N-benzylanthranilic acid in 17 ml. of 88% aqueous ethanol was added 0.070 g. of $RhCl_3.3H_2O$. The resulting mixture was stirred for 30 minutes at room temperature, and then excess sodium borohydride was added thereto. A black precipitate formed immediately; this was collected by filtration and washed several times with ethanol, and air-dried for 20 minutes. The catalyst thus obtained was suspended in 40 ml. of dimethyl formamide and 20 ml. of benzene.

After hydrogenation of the benzene for 24 hours under 60 psig of hydrogen, less than 1% of the benzene had been converted to cyclohexane.

Again, this experiment demonstrates that the supported N-benzylanthranilic acid will not give the desired hydrogenation reaction.

EXAMPLE 51

To 5.0 g. of polyvinyl chloride beads (Goodrich tire) in 25 ml. of 95% ethanol was added 5.0 g. of anthranilic acid. The mixture was refluxed for 30 minutes, then cooled to room temperature, filtered, washed with ethanol, and vacuum-dried. 5.0 g. of this product was stirred with 0.5 g. of $RhCl_3.3H_2O$ for two days. The resulting mixture was filtered and washed with ethanol, suspended in 20 ml. of ethanol, and an excess of sodium borohydride was added thereto. Portions of the beads turned black in color.

The prepared beads were filtered and washed with ethanol and air-dried for 1 hour. Then, 20 ml. of benzene was added, and the mixture pressurized to 60 psig of hydrogen. After 48 hours, less than 1% of the benzene had been converted to cyclohexane.

This catalyst was also found to be ineffective for hydrogenating cyclohexene.

This example demonstrates that the styrene polymer support used for the catalytic system of the invention is also important and contributes a significant role in obtaining the desired hydrogenation.

It is clear from these results that the catalytic system of the invention is quite sensitive and that the exact constitution thereof is quite critical in obtaining the desired hydrogenation results. Considering the advantages of the use of mild conditions of room temperature and low pressure, and the fact that a pure hydrogenation product uncontaminated with catalyst is readily obtained, it is apparent that this invention provides a significant advance in the technique for the catalytic hydrogenation of organic compounds.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A heterogeneous catalyst consisting essentially of anthranilic acid complexed with a metal selected from the group consisting of rhodium, ruthenium, palladium and platinum, said anthranilic acid complex being chemically linked through the amino group thereof to a polymeric support having reactive sites thereon for effecting a chemical linkage between the anthranilic acid complex and said polymer.

2. The catalyst of claim 1, wherein the metal complexed with anthranilic acid is rhodium.

3. The catalyst of claim 1, wherein the metal complexed with anthranilic acid is palladium.

4. The catalyst of claim 1, wherein the polymeric support is chloromethylated polystyrene.

5. A process for the preparation of the catalyst of claim 1 which comprises reacting anthranilic acid in an inert organic solvent with a polymer substrate having reactive sites thereon for effecting a chemical linkage between the amino group of said anthranilic acid and said polymer substrate, and thereafter contacting the thus treated polymer substrate, in an inert organic solvent, with a compound of a metal selected from the group consisting of rhodium, ruthenium, palladium and platinum for a time sufficient to effect a complexation reaction therebetween.

6. The process of claim 5, wherein said compound is a rhodium compound.

7. The process of claim 6, wherein the complex of rhodium with anthranilic acid which is chemically linked to said polymer substrate is thereafter treated with a reducing agent effective to reduce said rhodium to a lower valent state.

8. The process of claim 5, wherein said compound is a palladium compound.

9. The catalyst of claim 1, wherein the reactive sites on said polymeric support are $CH_2Cl$ groups.

* * * * *